(12) United States Patent
Cannon et al.

(10) Patent No.: US 7,702,424 B2
(45) Date of Patent: Apr. 20, 2010

(54) UTILITY LOAD CONTROL MANAGEMENT COMMUNICATIONS PROTOCOL

(75) Inventors: Joel Cannon, Minneapolis, MN (US); Robert Cox, Carrington, ND (US); Roger Rognli, Otsego, MN (US)

(73) Assignee: Cannon Technologies, Inc., Golden Valley, MN (US)

( * ) Notice: Subject to any disclaimer, the term of this patent is extended or adjusted under 35 U.S.C. 154(b) by 0 days.

(21) Appl. No.: 11/978,933

(22) Filed: Oct. 30, 2007

(65) Prior Publication Data

US 2008/0133065 A1    Jun. 5, 2008

Related U.S. Application Data

(62) Division of application No. 10/922,120, filed on Aug. 19, 2004.

(60) Provisional application No. 60/496,532, filed on Aug. 20, 2003.

(51) Int. Cl.
*G05B 15/02* (2006.01)
*G05B 11/01* (2006.01)
*G05D 3/12* (2006.01)
*G08B 1/08* (2006.01)

(52) U.S. Cl. .............. 700/295; 700/9; 700/11; 700/24; 340/539.1

(58) Field of Classification Search ............. 700/9, 700/11, 24, 276, 286, 295, 296; 702/62; 705/412; 340/539.1
See application file for complete search history.

(56) References Cited

U.S. PATENT DOCUMENTS

| | | | |
|---|---|---|---|
| 3,558,911 A | 1/1971 | Chen | |
| 3,683,343 A | 8/1972 | Feldman et al. | |
| 3,993,984 A | 11/1976 | Penrod | |
| D248,838 S | 8/1978 | Pasquarette et al. | |
| 4,130,874 A * | 12/1978 | Pai | ............. 709/245 |
| 4,156,280 A | 5/1979 | Griess | |
| 4,190,800 A | 2/1980 | Kelly, Jr. et al. | |
| 4,228,511 A | 10/1980 | Simcoe et al. | |
| 4,341,345 A | 7/1982 | Hammer et al. | |

(Continued)

FOREIGN PATENT DOCUMENTS

EP    0 593 225 B1    4/1997

(Continued)

OTHER PUBLICATIONS

Honeywell International, Inc. and Cannon Technologies, Inc., ExpressCom LCR, see www.honeywellcannon.com., 2003.

(Continued)

*Primary Examiner*—Sean P Shechtman
(74) *Attorney, Agent, or Firm*—Patterson, Thuente, Skaar & Christensen, P.A.

(57) ABSTRACT

A load control management protocol, system, and method that address many different customers, individually, in geographic groups, or in other predefined groups to control at least one or more electrical power consuming appliances are disclosed. The computer-implemented protocol provides wired and wireless communication schemes that enable a utility to quickly and efficiently communicate commands and messages to end user devices. Specific electrically powered appliances and certain uses of electricity can therefore be managed by communicating with the controllers of those appliances, providing management of a utility load during peak price and consumption periods to prevent delivery interruptions.

34 Claims, 13 Drawing Sheets

U.S. PATENT DOCUMENTS

| | | | |
|---|---|---|---|
| 4,345,162 A | 8/1982 | Hammer et al. | |
| 4,371,947 A | 2/1983 | Fujisawa | |
| 4,389,577 A | 6/1983 | Anderson et al. | |
| 4,390,876 A | 6/1983 | Bjorklund et al. | |
| D270,815 S | 10/1983 | Odom | |
| 4,415,943 A | 11/1983 | Wortman | |
| 4,464,724 A | 8/1984 | Gurr et al. | |
| 4,551,812 A | 11/1985 | Gurr et al. | |
| 4,583,090 A | 4/1986 | Eden et al. | |
| 4,620,283 A | 10/1986 | Butt et al. | |
| 4,635,214 A | 1/1987 | Kasai et al. | |
| 4,657,179 A | 4/1987 | Aggers et al. | |
| 4,672,501 A | 6/1987 | Bilac et al. | |
| 4,780,910 A | 10/1988 | Huddleston et al. | |
| 4,804,938 A | 2/1989 | Rouse et al. | |
| 4,808,803 A * | 2/1989 | Magier et al. | 235/382 |
| 4,819,180 A | 4/1989 | Hedman et al. | |
| 4,902,964 A | 2/1990 | Szabela et al. | |
| 5,099,348 A | 3/1992 | Huddleston et al. | |
| 5,197,668 A | 3/1993 | Ratz et al. | |
| 5,203,497 A | 4/1993 | Ratz et al. | |
| 5,218,552 A | 6/1993 | Stirk et al. | |
| 5,319,296 A | 6/1994 | Patel | |
| 5,414,640 A | 5/1995 | Seem | |
| 5,426,620 A | 6/1995 | Budney | |
| 5,462,225 A | 10/1995 | Massara et al. | |
| 5,475,609 A | 12/1995 | Apothaker | |
| 5,502,339 A | 3/1996 | Hartig | |
| 5,519,622 A | 5/1996 | Chasek | |
| 5,576,700 A | 11/1996 | Davis et al. | |
| 5,579,700 A | 12/1996 | Nuechterlein et al. | |
| 5,619,121 A | 4/1997 | Trainor | |
| 5,640,153 A | 6/1997 | Huldebrand et al. | |
| 5,675,503 A | 10/1997 | Moe et al. | |
| 5,687,139 A | 11/1997 | Budney | |
| 5,696,695 A | 12/1997 | Ehlers et al. | |
| 5,761,083 A | 6/1998 | Brown, Jr. et al. | |
| 5,936,817 A | 8/1999 | Matsko et al. | |
| 5,971,598 A | 10/1999 | Baba et al. | |
| 6,029,092 A | 2/2000 | Stein | |
| 6,098,893 A | 8/2000 | Berglund et al. | |
| 6,157,874 A | 12/2000 | Cooley et al. | |
| 6,167,389 A | 12/2000 | Davis et al. | |
| 6,181,985 B1 | 1/2001 | O'Donnell et al. | |
| 6,208,905 B1 | 3/2001 | Giddings et al. | |
| 6,254,009 B1 | 7/2001 | Proffitt et al. | |
| 6,264,110 B1 | 7/2001 | Proffitt et al. | |
| 6,305,611 B1 | 10/2001 | Proffitt et al. | |
| 6,314,378 B1 | 11/2001 | Hodge et al. | |
| 6,356,426 B1 | 3/2002 | Dougherty | |
| 6,377,874 B1 | 4/2002 | Ykema | |
| 6,480,803 B1 | 11/2002 | Pierret et al. | |
| 6,496,342 B1 | 12/2002 | Horvath | |
| 6,509,841 B1 | 1/2003 | Colton et al. | |
| 6,512,966 B2 | 1/2003 | Lof et al. | |
| 6,519,509 B1 | 2/2003 | Nierlich et al. | |
| 6,574,581 B1 | 6/2003 | Bohrer et al. | |
| 6,587,739 B1 | 7/2003 | Abrams et al. | |
| 6,622,926 B1 | 9/2003 | Sartain et al. | |
| 6,634,566 B2 | 10/2003 | Archacki, Jr. et al. | |
| 6,671,586 B2 | 12/2003 | Davis et al. | |
| 6,681,154 B2 | 1/2004 | Nierlich et al. | |
| 6,745,106 B2 | 6/2004 | Howard et al. | |
| 6,747,571 B2 | 6/2004 | Fierro et al. | |
| 6,789,739 B2 | 9/2004 | Rosen | |
| 6,806,446 B1 | 10/2004 | Neale | |
| 6,816,350 B1 | 11/2004 | Hoopes | |
| 6,828,695 B1 | 12/2004 | Hansen | |
| 6,891,478 B2 | 5/2005 | Gardner | |
| 6,975,926 B2 | 12/2005 | Schanin | |
| 6,975,958 B2 | 12/2005 | Bohrer et al. | |
| 7,010,363 B2 | 3/2006 | Donnelly et al. | |
| 7,136,725 B1 | 11/2006 | Paciorek et al. | |
| 7,163,158 B2 | 1/2007 | Rossi et al. | |
| 7,172,132 B2 | 2/2007 | Proffitt et al. | |
| 7,216,015 B2 | 5/2007 | Poth | |
| 7,222,111 B1 | 5/2007 | Budike, Jr. | |
| 7,242,114 B1 | 7/2007 | Cannon et al. | |
| 7,243,114 B2 | 7/2007 | Akazawa et al. | |
| 7,292,114 B2 | 11/2007 | Greenberg | |
| 7,346,467 B2 | 3/2008 | Bohrer et al. | |
| 7,355,301 B2 | 4/2008 | Ockert et al. | |
| 7,528,503 B2 | 5/2009 | Rognli et al. | |
| 7,595,567 B1 | 9/2009 | Cannon et al. | |
| 2002/0019712 A1 * | 2/2002 | Petite et al. | 702/61 |
| 2002/0087234 A1 | 7/2002 | Lof et al. | |
| 2002/0103655 A1 | 8/2002 | Boies et al. | |
| 2002/0138176 A1 | 9/2002 | Davis et al. | |
| 2003/0150925 A1 | 8/2003 | Archacki, Jr. et al. | |
| 2003/0158632 A1 | 8/2003 | Nierlich et al. | |
| 2004/0255601 A1 | 12/2004 | Kwon et al. | |
| 2005/0097905 A1 | 5/2005 | Kwon et al. | |
| 2005/0143865 A1 | 6/2005 | Gardner | |
| 2006/0036349 A1 | 2/2006 | Kates | |
| 2006/0036350 A1 | 2/2006 | Bohrer et al. | |
| 2006/0283964 A1 | 12/2006 | Garozzo | |
| 2006/0283965 A1 | 12/2006 | Mueller et al. | |
| 2007/0021874 A1 | 1/2007 | Rognli et al. | |

FOREIGN PATENT DOCUMENTS

WO        WO 01/52478 A3      7/2001

OTHER PUBLICATIONS

U.S. Appl. No. 10/922,120, filed Aug. 19, 2004, Cannon et al.

* cited by examiner

|  |  | MESSAGE ADDRESS | | | | | | |
| --- | --- | --- | --- | --- | --- | --- | --- | --- |
|  |  | 0 | 1 | 2 | 3 | .... | FFFE | FFFF |
| DEVICE ADDRESS | 0 | * | | | | | | |
| | 1 | * | * | | | | | * |
| | 2 | * | | * | | | | * |
| | 3 | * | | | * | | | * |
| | .... | * | | | | * | | * |
| | FFFE | * | | | | | * | * |
| | FFFF | * | | | | | | * |

| MESSAGE TYPE | MESSAGE DATA | ... | MESSAGE DATA | MESSAGE TYPE | MESSAGE DATA | ... |
|---|---|---|---|---|---|---|
| 410 | 420 | | | | | |

| START | ADDRESS LEVEL | SPID ADDRESS | MESSAGE TYPE 0X2D | REQUEST ID | LENGTH OF REQUEST | REQUEST BYTE #1 | ... | REQUEST BYTE n | SCHEDULE ID | PERIOD | OFFSET | TIMEOUT | TERM |
|---|---|---|---|---|---|---|---|---|---|---|---|---|---|
| 1802 | 1804 | 1806 | 410 | 1808 | 1810 | 1812 | 1814 | 1816 | 1818 | 1820 | 1822 | 1824 | 1826 |

| START | ADDRESS LEVEL | ADDRESS SERIAL | | | | MESSAGE TYPE 0X2C | REQUEST ID | LENGTH OF REQUEST | REQUEST BYTE #1 | ... | REQUEST BYTE n | REQUEST LENGTH | DATA BLOCK | TERM |
|---|---|---|---|---|---|---|---|---|---|---|---|---|---|---|
| 1802 | 1804 | | ADR. SER. | ADR. SER. | ADR. SER. | 410 | 1808 | 1810 | 1812 | 1814 | 1816 | 1904 | 1906 | 1826 |

UTILITY LOAD CONTROL MANAGEMENT COMMUNICATIONS PROTOCOL

PRIOR APPLICATION

This application is a divisional application of U.S. application Ser. No. 10/922,120 filed Aug. 19, 2004, entitled "Utility Load Control Management Communications Protocol", and claims priority to U.S. Application Ser. No. 60/496,532, filed Aug. 20, 2003, entitled "Utility Load Control Management Communications Protocol", both of which are herein incorporated by reference.

RELATED APPLICATION

The present application claims the benefit of U.S. Provisional Application No. 60/496,532 filed Aug. 20, 2003, which is incorporated herein in its entirety by reference.

FIELD OF THE INVENTION

The invention generally relates to utility load control, and more particularly to managing utility load by communicating control commands to remotely locate utility equipment.

BACKGROUND OF THE INVENTION

Utility companies, specifically electricity generating and distributing utilities, must be able to generate sufficient power to serve the peak energy demand of their customers. It is well understood in the industry that the base demand is the least expensive energy to generate, while the peak demand can be the most expensive, requiring expensive peaking generators or the purchase of additional power from other utilities on a spot market. If the peak demand exceeds the capacity of the utility to generate or purchase electricity, the quality of the power provided can decline, resulting in brown-outs or load-shedding with involuntary black-outs to at least some of the utility's customers. One type of load shedding is the rolling blackout, where delivery of power to certain areas is cut off for shorter periods of time in an attempt to share the shortage over a wider base. These types of actions are necessary to maintain the quality of the power delivered to the remaining customers. Poor quality of delivered power can cause damage to expensive equipment of both the customer and the utility.

To address these problems, the utility can either increase generating capacity or reduce peak demand. Additional generating capacity is difficult and expensive to obtain, sometimes requiring the building of additional power plants. Regulatory delays and increased public opposition to the pollution and risks of new power plants has made this type of increase in capacity a long and expensive solution that is not practical for most utilities.

The less expensive and easier to implement solution to the problem is to reduce demand during peak periods through voluntary load shedding, where the power to some customers is voluntarily cut off. Voluntary load shedding has been attempted with public service pleas over the radio or television for customers to reduce their power consumption by raising the set-point on their air conditioner thermostats, closing their blinds to keep the sun out, or similar activities. For example, a residential power customer can use a set-back thermostat during the cooling season to raise the temperature of a residence during the day when the house is unoccupied, thus reducing power consumed and saving money. A set-back thermostat can be used to control an air conditioner, or a similar thermostat device used to control hot water heaters.

Other voluntary programs exist in which utility customers agree to allow the utility to reduce or eliminate power supplied during peak periods, usually with the incentive of reduced billing rates when enrolled in such programs. These programs can require action as dramatic as shutting down an entire factory, or as simple as shutting off a single residential air conditioner.

Other systems and methods of controlling energy usage and demand have also been developed. For example, U.S. Pat. No. 5,640,153 discloses an energy utilization controller and control system and method. Control data is transmitted from a remote location to a plurality of paging data receivers connected to respective energy management systems through a paging network and the energy management systems react depending on whether one or more predetermined addresses are within the control data.

U.S. Pat. No. 5,099,348 describes a display for remote receiver in a utility management system. Remote receivers in the utility management system are responsive to encoded command signals to perform utility control functions, such as removing electrical loads from the electrical distribution system or connecting a subscriber to a CATV system.

In U.S. Pat. No. 6,167,389, a control system is disclosed that varies the operation of consumer devices to minimize influx currents across a power grid. Power consuming devices are scheduled to operate in accordance with varying price tiers. The invention randomizes start up times of controlled devices so as to minimize the strain of the power grid as each one comes on line.

While the voluntary systems previously described offer some relief during peak demand periods and can be somewhat effective if a sufficient number of consumers participate, many residential customers then return to their residences and want their homes cooled down at exactly the time of the utility's peak power demand and at the time when the utility most wants to reduce demand. This is one reason the peak demand often occurs in the late afternoon, as the workday ends and utility customers return home. Another reason that the peak demand is in the late afternoon is that this can be the hottest part of the day.

Compliance with this type of voluntary load shedding has traditionally not been sufficiently effective enough to reduce demand and meet the short-term energy shortages thereby created. Further, the programs are slow to implement because of communication delays before power is cut off. For a utility to shut off 10,000 residential air conditioners would require the utility to manually or automatically send 10,000 commands to 10,000 individual customers. This process would not take place fast enough to successfully manage some peak load situations, for example when a transmission line or power generating plant goes off-line. Additionally, these systems are typically reactive and unpredictable, reducing peak demand only when there is an actual problem and making this type of load shedding extremely disruptive to each affected customer.

Therefore, a need remains in the industry for a high-speed, cost-effective, and reliable way to reduce peak power consumption through voluntary and utility-controlled load shedding.

SUMMARY OF THE INVENTION

The invention disclosed and described herein substantially addresses the above described needs by providing a load control management protocol, system, and method that quickly address many different customers, individually, in geographic groups, or in other predefined groups to control at least one or more electrical power consuming appliances. Further, the protocol, system, and method can control specific appliances and certain uses of electricity by communicating with the controllers of those appliances, for example set-back thermostats used to control air conditioners or a controller of area lighting for either indoor or outdoor lighting.

The invention facilitates communication between a utility and a thermostat to manage demand of thermostat-controlled devices. A utility can therefore reduce peak demand by pre-cooling a thermostat-controlled space before a peak demand period, for example in an early summer afternoon. The utility can remotely turn off air conditioners during the peak time, thereby shedding some load during peak demand time while the resident remains reasonably comfortable during the same period. Additional appliances such as hot water heaters or area lighting are similarly controlled to reduce power consumption during peak load periods with minimal disruption to residential or business customers. Industrial and office customers will also have machines and appliances that are controlled via wireless communication from the utility to reduce peak load demand. The invention thereby provides a way to quickly control many such appliances and machines.

The invention also provides a computer-implemented communications protocol to address a large set of customers, a set of specific appliances, selected geographic regions, or selected groups of appliances for a single or group of customers as desired in various embodiments. The invention thereby provides a load shedding protocol that is able to operatively address not only one specific customer and appliance, but is also able to address all customers or appliances in a certain geographic region with one command. For example, all customers or appliances in a certain ZIP or postal code area can be selected in one embodiment of the invention, or more than one appliance can be addressed in a single command so as to control both the air conditioner and the hot water heater, or some other combination of energy-consuming devices. The protocol also provides a plurality of available command and data message formats, enabling a utility to efficiently communicate a single command or multiple commands concatenated in a single message to a single device or group of devices.

The protocol, system, and method of the invention thereby substantially meet the aforementioned needs of the electric utility industry. The protocol, system, and method of the invention result in lower cost and more rapid control of both voluntary and involuntary load shedding schemes by controlling existing loads to adapt to changing power delivery capacity or by reducing load during peak load conditions to avoid or minimize brownouts or blackouts, among other things. The communications protocol of the invention is also easily adaptable to existing equipment and installed communication means and methods currently in use by providers of electric power.

The above summary is not intended to describe each illustrated embodiment or every implementation of the invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 18 depicts a request data command message according to one embodiment of the invention.

FIG. 19 depicts a data reply message according to one embodiment of the invention.

Figure 1:
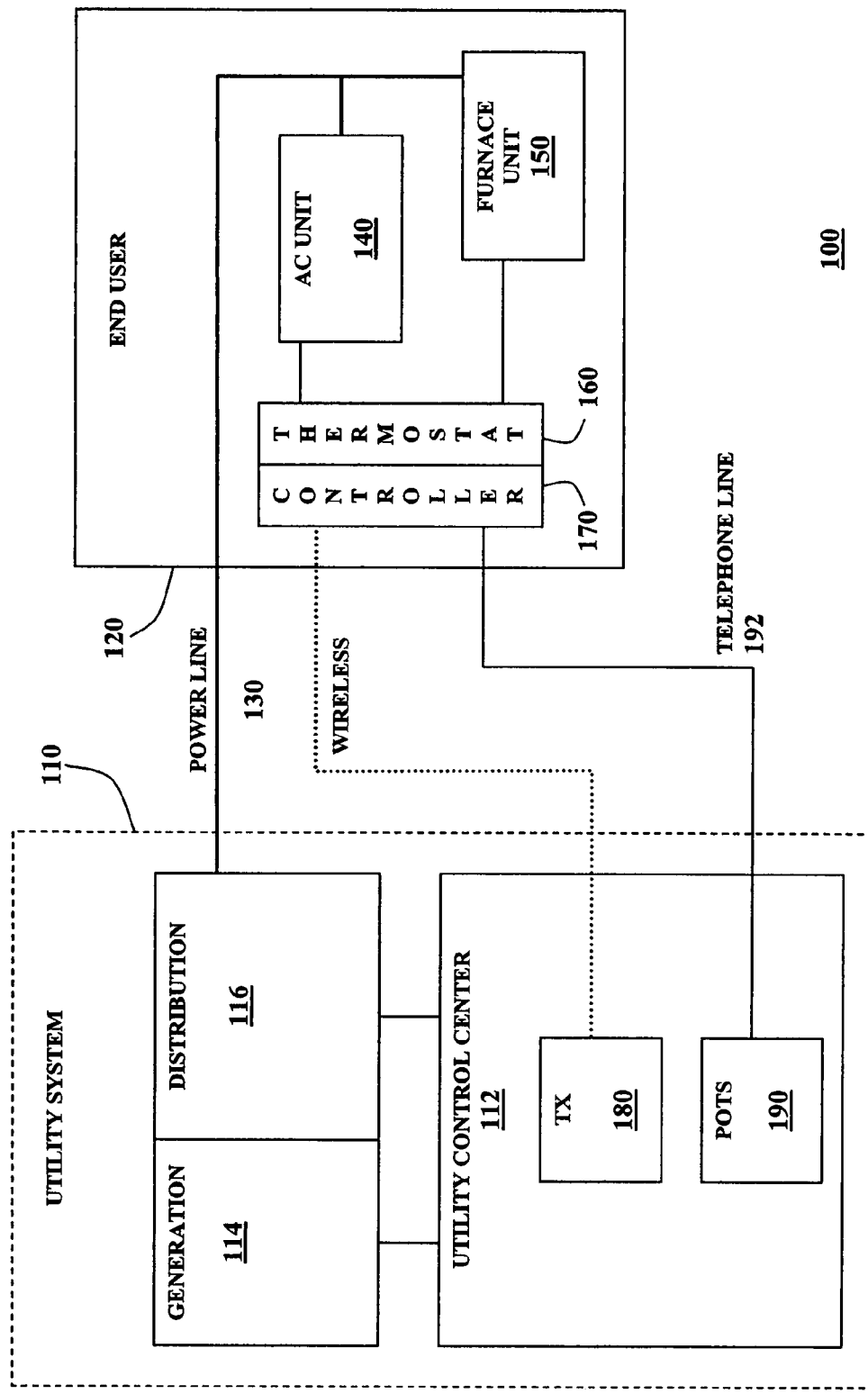
FIG. 1 is a block diagram of a utility system providing electricity to and communicating with an end user according to one embodiment of the invention.

While the invention is amenable to various modifications and alternative forms, specifics thereof have been shown by way of example in the drawings and will be described in detail herein. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

Various embodiments of the protocol, system, and method of the invention provide control and management of a utility power-consuming load via a communications protocol administered by a master utility station. The invention can be more readily understood by reference to FIGS. 1-20, the Appendix, and the following description. The Appendix includes exemplary protocol message formats in accordance with various embodiments of the invention and is incorporated herein by reference in its entirety. While the invention is not necessarily limited to such an application, the invention will be better appreciated using a discussion of exemplary embodiments in specific contexts.

The various embodiments of the invention disclosed and described herein include a communications protocol that can, under control by a master station, communicate with a device remote controller by power line communications (PLC) methods, internet communication methods, or radio frequency (RF) communication methods in a utility and end user system. The invention can be implemented with various communication interfaces including, for example, 900 MHz FLEX one-way paging, AERIS/TELEMETRIC Analog Cellular Control Channel two-way communication, SMS Digital two-way communication, or DNP Serial compliant communications for integration with SCADA/EMS communications currently in use by electric generation utilities. The communications protocol of the invention also facilitates the control of any specified action resulting from a received communication. Such control can provide, among other actions, control of remote thermostat settings, instructions to shut down or occasionally cycle the controlled electric use, and interrogation of the controlled appliance for information relating to power consumption or other indicators of use or conditional status. Additionally, the communications protocol of the invention can control execution of any action that would improve the quality of the electric power delivered by the utility to its customers.

One embodiment of the invention provides multiple level device addressing. For example, the protocol can address a single end user appliance device using a device-level address. The protocol can also address more than one device through group-level addressing. The addressing is configurable by unique device serial number or by a combination of serial numbers, a combination of groups, or a combination including both serial numbers and groups. Multiple addresses can be provided in one addressing slot. Additionally, protocol control features are available by device serial number or by any of the addressing combinations above. The protocol also provides utility user-configurable options, including required addressing levels and logical/physical relay assignments.

Another embodiment of the protocol provides messaging options to improve communications. The protocol can operate in a dual frequency communication scheme and in one embodiment provides remote changing between programmed frequencies. Remote changing can be accomplished by the protocol with safety measures to prevent orphan system devices. Changing between programmed frequencies can also be accomplished locally or can be time triggered, for example by using a settable timer frequency or a timer reset based on specified parameters. Multiple capacitors can also be addressed on the same frequencies. Protocol messages can also include message priorities in communications that include multiple messages.

The protocol can configure device parameters, for example by device serial number or any device-level addressing combination. Another embodiment of the protocol is also compatible with and incorporates predecessor protocols. The protocol provides random number override by device, i.e. all random number commands result in zero, and can enable or disable status indicators by a device or addressing combination.

Yet another embodiment of the protocol of the invention provides increased communicative and system efficiency and functionality through a plurality of control commands and messages. The protocol includes the following functionality options in one embodiment: under-frequency control; under-voltage control; cycling control, including true cycle control and cycling control with temperature limits; temperature ramping control; device fan on/off during control; device data logging capabilities with system and device time synchronizations; selectable histories types, including time or activations; selectable propagation display times; propagation counts for testing; and device-to-device data message transmissions.

FIG. 1 illustrates a system 100 in which a utility system 110 providing electricity to an end user 120 can communicate with the electrical equipment, appliances, and thermostat devices of end user 120 to control the electrical consumption of the devices. Utility system 110 includes a central utility control center 112 in operative communication with a power generation system 114 and a power distribution system 116. Generation system 114 can include one or a plurality of power generating facilities, for example fossil fuel burning, hydro-electric, and nuclear plants, while distribution system 116 generally includes transformer-equipped routing stations and substations electrically coupling generation system 114 to a plurality of end users 110 via above- or below-ground power distribution lines 130. Utility 110 provides electricity through a power line 130 to end user 120 such that end user 120 utilizes the electricity to power, for example, an air conditioning (AC) unit 140 and a furnace 150, among other household appliances, lighting, and general electrically powered devices. AC unit 140 and furnace 150 are controlled by a thermostat 160 electrically coupled to a controller 170.

End user 120 can be a residential, business, or industrial customer. While FIG. 1 depicts end user 120 having a single thermostat 160 and controller 170, as would be typical in a central residential heating and air conditioning system, system 100 can also be implemented with end user 120 embodiments having individual device thermostats. For example, in one embodiment AC unit 140 comprises a first thermostat (not shown) for controlling unit 140, while furnace 150 comprises a second thermostat (not shown) for controlling furnace 150, wherein each the first and second thermostats includes a controller. In another embodiment, a single controller is electrically coupled to each the first and second thermostats. In yet another embodiment, only one unit 140, 150 includes or is coupled to a controller for communication with utility 110, at end user 120's discretion at installation.

In the embodiment depicted in FIG. 1, utility 110 wirelessly transmits control commands, or messages, by radio frequency (RF) via a transmitter 180 to controller 170 coupled to thermostat 160. In other embodiments, messages are transmitted via the Internet or power line control (PLC) methods to controller 170. These wired transmission modes may be necessary in some situations to reach remote end users 120 or those not capable of receiving RF messages because of localized interference or obstructions. In one exemplary embodiment, messages are sent via the Internet and routed via plain old telephone service (POTS) 190 and telephone line 192 to end user 120. Power line 130 is also available for wired message transmissions in other embodiments.

In one embodiment, the controller 170, thermostat 160, or device 140 and 150 includes a status indicator that is responsive to the control commands or messages. For example, the status indicator can comprise a light-emitting diode (LED) or a plurality of LEDs to visually indicate a message reception or implementation status, or targeted device operational status as a result of a message, to an end user in one embodiment.

Utility 110 transmits messages individually, or in combination, to a set of addresses that include geographic addresses, load-level addresses, or individual device-level addresses. The messages thus can either be transmitted to an individual address or multiple individual addresses, or can be transmitted to a group or groups of addresses. Message can also be sent to a combination of device-level and group-level addresses in one embodiment. For example, a single message can be sent to one device-level address and one group-level address, or any other combination of device-level addresses and group-level addresses.

In one embodiment, system 100 supports at least 256 unique computer-implemented communication protocol message types, for example specific load management messages, configuration messages, maintenance messages, and data messages, while also providing extendibility options to support additional functionality. Protocol messages are preferably binary byte-oriented messages but can also be converted to ASCII messages representing hex values or another message protocol format recognized by those skilled in the art. While protocol messages are preferably byte-oriented, specific messages can break individual bytes into bit-fields as necessary. Multi-byte fields are transmitted with the most significant byte first. For example, the two-byte value "2000" would be transmitted in two bytes 07,D0. The length of any message is determined from the data in the message itself. It is thus not necessary to continue parsing a message until no additional data is found, thereby enabling multiple messages to be concatenated, forming a single variable length message.

One embodiment of the computer-implemented protocol of the invention is designed to provide nine levels of addressing: eight group-level and one device-level. In this embodiment, six geographical address levels are dedicated to broadcasting to end user devices based upon geography, while two address levels are dedicated to load-level addressing. Group-level addresses can be sent together to narrow the target area. A device-level address is also available for communicating with an individual target device. In one embodiment, the individual target device is identified by its unique serial number.

Figures 2, 3:
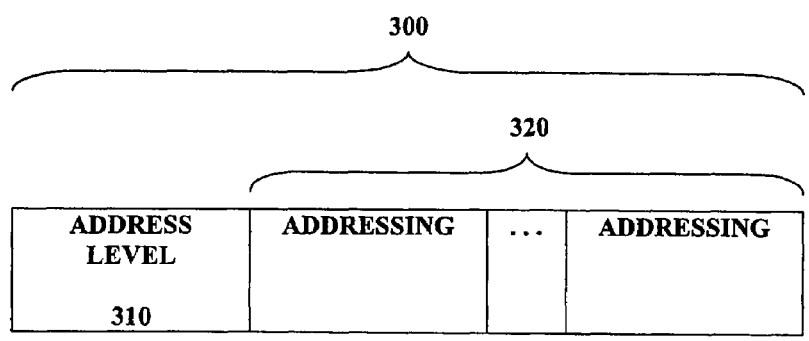
FIG. 2 is a table of device and message addresses and responses according to one embodiment of the invention.
FIG. 3 depicts message addressing according to one embodiment of the invention.

Several values have special meaning in one embodiment of the protocol. For example, 0xff, 0xffff, and 0xffffff, for one-, two-, and three-byte address values, respectively, are universal "all call" addresses to which any end user device with a valid non-zero address at this addressing level will respond if all other addressing criteria are met. FIG. 2 includes the various address responses and the addresses used in the message and in the device. If an asterisk (*) is shown, the device will respond to the message. Note also that a feeder, a bit-wise address level, will respond if the message address and the device address have any set bits in common, i.e. the bit-wise and operation result is non-zero.

When a geographical group address is used, any combination of the levels can be collectively sent in a message, allowing maximum flexibility for targeting field devices. A service provider address (SPID) is a two-byte address level sent with all group address messages and used to identify the service provider, or owner utility 110, in case of any communications crosstalk or on a shared communications network. Valid values are 1 to 65,534 in one embodiment. A GEO address is a two-byte address level geography code intended to identify a target geographical area as determined by utility 110, where valid values are 1 to 65,534. A substation address is a two-byte address level intended to identify the utility substation on which the target end user equipment is located. Valid values are 1 to 65,534. A feeder address is a two-byte address level intended to identify the utility feeder that feeds the load and is normally, although not exclusively, combined with the substation address. Each bit in the feeder address represents a feeder and therefore supports up to sixteen feeders, allowing a set number of feeders to be targeted with a single message. Feeders are numbered one to sixteen from least significant bit to most significant bit. A zip address is a three-byte address level that can be used as a postal ZIP code and can also be used for any other addressing options. Valid values are 1 to 16,777,214. A user-defined address, or UDA, is a two-byte address level intended to be user definable for any other desired addressing options and has valid values of 1 to 65,534.

When a load-level group address is used, any combination of the levels can be collectively sent in the message, including geographical addresses. This provides maximum flexibility for targeting end user devices. One load-level group address is a program address. This one-byte address level is used to target program loads. End user devices that control multiple loads will contain a separate program address for each load. Valid values are 1 to 254. Another load-level group is a splinter address, a one-byte address level used to target a subset of a program load address. End user devices that control multiple loads can contain a separate splinter address for each load device. Valid splinter address values are 1 to 254 and are normally sent with a program address, although the protocol does not prevent splinter address values from being sent alone.

Embodiments of the protocol of the invention also support individual end user device addressing by device serial number. The protocol is configured such that an individually addressed message applies to a single device and does not include any group addressing. This four-byte address level supports up to about 4,294,967,295 unique devices in one embodiment.

In addition to supporting group- and device-level addressing, embodiments of the protocol of the invention also support four primary categories of load management control commands. These categories include timed control messages, cycling control messages, restore control messages, and thermostat set-point control messages.

Timed control messages support a single time duration in which the load is to be controlled. Timed control messages can also include other parameters.

Cycling control messages cycle the load on and off for a specified time duration and for a defined number of periods. A percentage is also specified to calculate the off time.

A restore control message cancels a previous load control command and restores the targeted load. These messages can also include a random start time.

A thermostat set-point control message is used to set back or pre-operate, i.e. cool or heat, a smart thermostat end user device. A thermostat set-point control message includes data regarding the operational setting change.

The protocol of the invention further supports other messages, including distribution automation messages, maintenance messages, and data messages. A specialized capacitor control command message operates a relay in a capacitor control device. This message can also override local operating parameters or perform other specific capacitor bank controller functions. The protocol supports a variety of maintenance messages, which can include configuration commands, test commands, out of service commands, and history reset commands, among other maintenance message commands. Communication of data messages enables a block of data to be transferred to a selected device port. Data message commands can also support a reply form a two-way end user device.

The messages identified above will be described below in further detail. Each message generally comprises five elements:

Message start indicator
Message addressing
Message type
Variable fields (message type dependent)
Message terminator A start of message indicator marks the beginning of a message and can vary in protocol embodiments, based upon the communication technology used. For example, in a FLEX paging network, a message will begin with a single ASCII start of message character. Referring to FIG. 3, message addressing 300 includes a one-byte address-level indicator 310, followed by the addressing 320. The message address level byte 310 indicates the addressing that will be included in the message 300. A zero value indicates that the message is a unique serial number. Each other bit in the message represents an address level that has been included in the message. In one embodiment of the protocol of the invention, there are two categories of group addresses: geographical and load. Addressing 320 that is included in the message, based upon the bits that are set, will follow address level byte 310. Addresses 320 will be ordered according to the most significant bit position, i.e. service provider identifier first. This results in addressing portion 320 of message 300 having a variable length based upon the included addresses and their byte size.

Figures 4, 5:
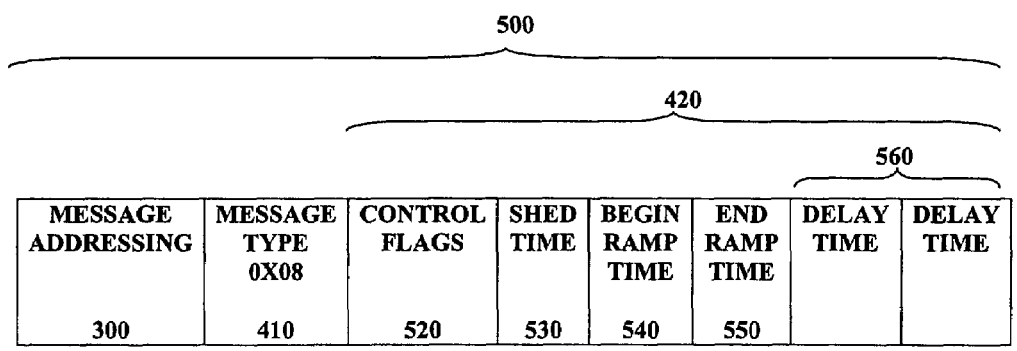
FIG. 4 depicts a variable length message including message type according to one embodiment of the invention.
FIG. 5 depicts a timed load control message according to one embodiment of the invention.

Referring to FIG. 4, a message type byte 410 will follow address level byte 310 and variable length addressing 320. Message type byte 410 indicates the type of message that has been sent. One embodiment of the protocol of the invention supports at least 256 unique message types. The variable length messages 420 follow message type byte 410. The protocol can support multiple message types and associated data in a single message. If the byte following the variable data in a message is not a message terminator, the protocol will interpret the byte as an additional message type.

The variable length messages 420 can include various command messages and other related information. Message 420 can include a synchronization message used to keep end user devices locked onto a given frequency or paging company, or a time synchronization message used to keep devices having internal clocks in synch with utility control center 112. Message 420 can also comprise a priority command message to set the priority of all following commands that are concatenated to this command. In one embodiment, "0" is the highest priority and "3" is the lowest, although these values can vary depending upon the application. Message 420 can further comprise a signal test message used to test signal reception of devices in the field.

Referring to FIG. 5, variable length message 420 can comprise a timed load control message 500 used to control an end user device load for a specified amount of time. In one embodiment, message 500 includes a shed time 530, a ramp-in time 540 and a ramp-out time 550, and a delay time 560 after the message control flags 520.

Figure 6:
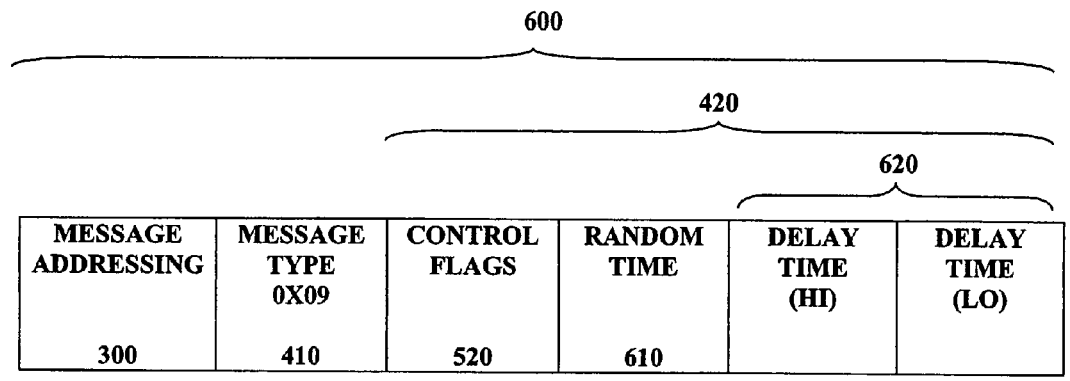
FIG. 6 depicts a restore load control message according to one embodiment of the invention.

FIG. 6 depicts a restore load control message 600. Message 600 is used to cancel control of a load in a device and can also include a ramp-out time 610 and a delay time 620.

Figure 7:
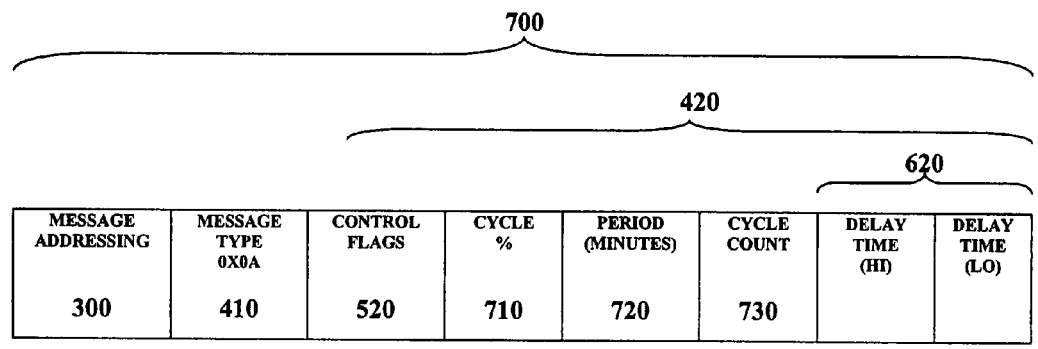
FIG. 7 depicts a cycle load control message according to one embodiment of the invention.

FIG. 7 illustrates one embodiment of a cycle load control message 700. Message 700 is used to control a load in an end user device by cycling the load off for some cycle period 720, or percentage of time of a specified number of minutes 710. Message 700 can also include a cycle count 730, the number of periods 710 for which to operate before stopping. A delay time 620 is optional but also available.

Figure 8:
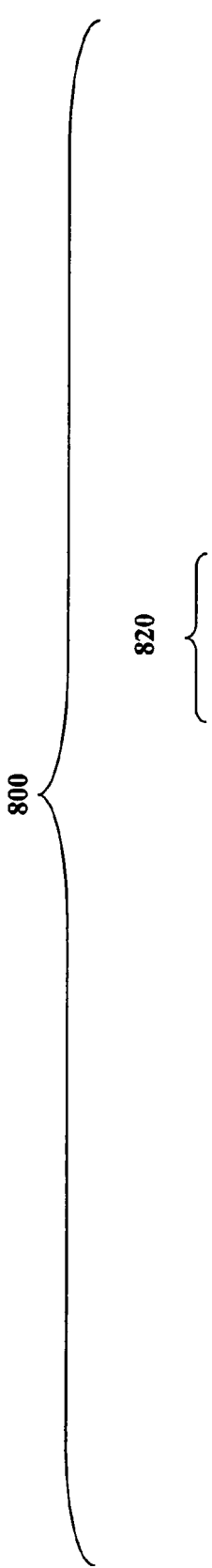
FIG. 8 depicts an extended cycle load control message according to one embodiment of the invention.

An extended cycle load control message can be used to control a load in a device by cycling the load off for a percentage of time of a specified number of minutes. FIG. 8 depicts one embodiment of an extended cycle load control message 800. After the message addressing 300 and message type 410, message 800 includes control flags 810 and 820. Control flags 810 can be used to indicate whether the device is in a heating or cooling mode, whether degree values will be expressed in Celsius units or Fahrenheit units, and other message indicators. Control flags 820 can include bits to prevent a ramp-in during start, limit and maximum temperature changes per hour, and particular load numbers to control, among other message indicators. Cycle percentage 710 communicates a percentage of off-time in a given period 720, where a zero percentage value terminates the current cycle control at the end of the current cycle period. Period 720 is expressed in minutes and in one embodiment supports periods of one to about 255 minutes. Cycle count 730 is the number of periods to operate before stopping. Message 800 also supports a two-byte delay start time in one embodiment, expressed in minutes. A control temperature value 830 is optional and controls the temperature during a cycle on time. A limit temperature 840 can be used to specify a maximum or minimum temperature. A fall back A % 850 is an optional new cycle percentage for use if the space temperature limit temperature is exceeded. A maximum degrees per hour message 860 is also optional and can specify a maximum heating or cooling rate, i.e. a maximum number of degrees a space temperature can change in an hour. A fall back B % message 870 is an optional new cycle percentage to be used if the space temperature is changing too quickly in a current cycle.

In one embodiment, if any thermostat command is received while another is being implemented, the new command will override the previous command when the new command's delay time is complete. This enables a restore command to be sent to terminate any thermostat control message.

Figure 9A:
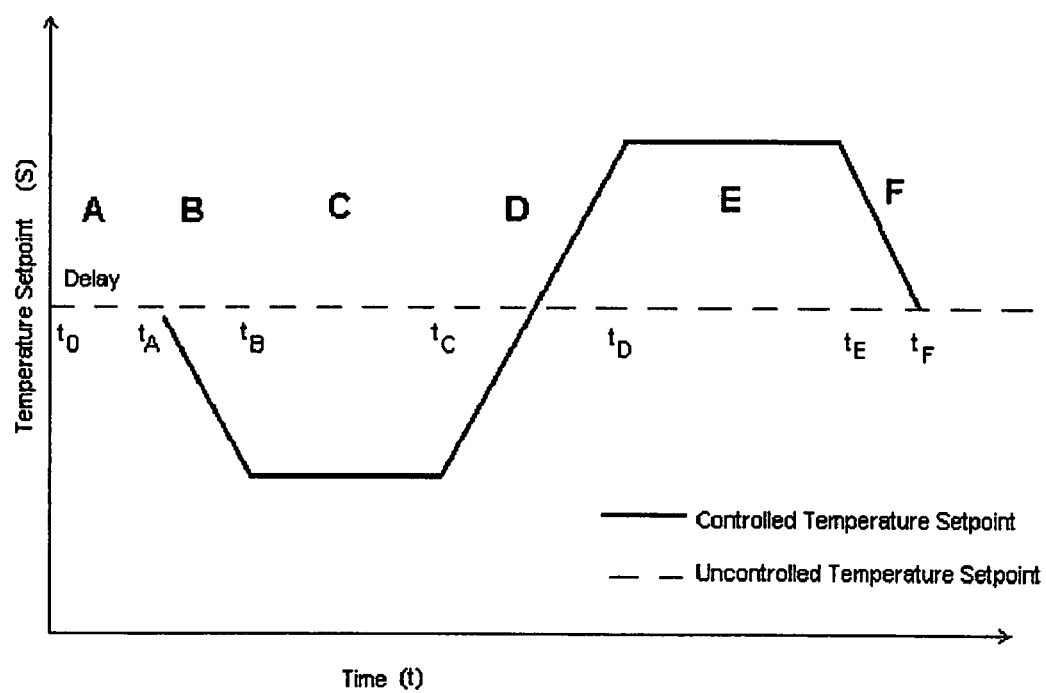
FIG. 9A is a diagram of a thermostat set-point control message implemented over time according to one embodiment of the invention.
Figure 9B:
FIG. 9B depicts one embodiment of a thermostat set-point control message according to one embodiment of the invention.

FIG. 9A is a diagram of an implementation over time of a thermostat set-point control message. FIG. 9B depicts one embodiment of a thermostat set-point control message 900. Message 900 is used to modify the temperature set-point of a "smart" thermostat. As shown in FIG. 9A, message 900 includes commands to implement change deltas offset from a current temperature, or absolute temperatures, ramp times, duration minutes, and optional upper and lower limits. Message 900 can also implement a start delay A. A pre-cooling period BC and a control period DEF are also shown, although message 900 can also apply to a pre-heating period followed by a lowered temperature set-point during control period DEF. Message 900 as depicted in FIG. 9B gradually pre-cools a temperature space and then gradually raises the space temperature, evenly distributing the demand relief across control period DEF. In one embodiment the temperature change can be adjusted to peak during the hour in which market rates are highest. The soft restore serves to alleviate a peak that would otherwise occur if all of the thermostats in a region were restored simultaneously. This method of control essentially prepays the payback that occurs at the end of all air conditioner control, thus increasing the available demand relief during target hours while maintaining customer comfort at an acceptable level.

At time $t_0$, command message 900 is received by the thermostat and controller (refer to FIG. 1). Delay time A, plus a random offset, can be implemented before message 900 is implemented at $t_A$. Time period B, from $t_A$ to $t_B$, is a ramped control period, wherein the set-point changes in one-degree increments to achieve a specified set-point, $S_B$, or set-point delta, $\Delta_B$, over a specified time period, $T_B$. Thus, the temperature set-point $S_B$ at time $t_B$ is defined as:

$$S_B = S_0 + \Delta_B$$

For example, if $\Delta_B = 3$ degrees and $T_B = 90$ minutes, the temperature set-point $S_B$ would be decreased by one degree at $t_A$, by another degree at $t_A+30$, and by a further degree at $t_A+60$. If absolute temperatures are specified in message 900, the formula is defined as:

$$\Delta_B = S_B - S_0$$

Time segment C, from $t_B$ to $t_C$, shows a plateau control period, wherein the setpoint $S_B$ is maintained for a specified time, $T_C$, at the set-point $S_B$ programmed in time segment B. Time segment D, from $t_C$ to $t_D$, shows a ramped control period, wherein set-point $S_B$ changes in one-degree increments to achieve a specified set-point delta, $\Delta_D$, over a specified time period $T_D$. Because $\Delta_D$ is referenced to $S_B$, the temperature set-point $S_D$ at $t_D$ is defined as:

$$S_D = S_B + \Delta_D = S_0 + \Delta_B + \Delta_D$$

Time segment E, from $t_D$ to $t_E$, shows a plateau control period, wherein the set-point is maintained for a specified time, $T_E$, at the set-point $S_D$ programmed in time segment D. Time segment F, from $t_E$ to $t_F$, shows a ramped control period in which the set-point changes in one-degree increments to achieve a specified set-point delta, $\Delta_F$, over a specified time period, $T_F$. $\Delta_F$ is referenced to $S_D$, thus the temperature set-point $S_F$ at $t_F$ is defined by the following:

$$S_F = S_D + \Delta_F = S_0 + \Delta_B + \Delta_D + \Delta_F$$

Set-point $S_F$ will generally be the same as the original set-point $S_0$:

$$\Delta_B + \Delta_D + \Delta_F = 0$$

Regardless, all control of the thermostat will cease when this ramp control period finishes in one embodiment unless a maintain control bit is set in message 900.

When implementing a ramped temperature control of $\Delta$ degrees over time period T, the thermostat will typically be adjustable in discrete steps, for example one degree each. The first step will be taken at the start of the period and the last step, if there is more than one step, will be taken at the end of the period T. Additional steps will be taken at equal intervals of $T/(\Delta-1)$ over the period T. Because the last step is not taken until the end of the period, a plateau control period is implemented in one embodiment to allow the thermostat to bring the room to the new set-point for the ramped temperature control to be effective.

As shown in FIG. 9B, message 900 comprises message addressing 300, message type 410, and control flag 810 and 820 bytes as previously described with reference to other command messages. Control flags 810 and 820 can be used to specify temperature units of measure, inclusion of minimum or maximum temperature values, heating or cooling modes, and other message indicators. Extended control flags 910 are optional and can be used to indicate which particular load or loads to target for control. Min byte 920 and max byte 930 are also optional bytes of message 900 and can be used to set a minimum and maximum temperature in degrees. Any calculated set-points that exceed the minimum and/or maximum temperatures specified by min 920 and max 930 will be set to the specified temperatures, respectively. In one embodiment, min 920 and max 930 bytes are only present in message 900 when corresponding bits in control flags 810 and 820 are present.

The remaining bytes shown in message 900 are also optional. With reference to FIG. 9A and the previous corresponding description, $T_R$ sets a random offset time in minutes. TA sets a delay time in minutes. $T_B$ is used to set a ramp time in minutes, $\Delta_B$ indicates the set-point delta relative to the uncontrolled set-point in degrees, and $S_B$ sets an absolute set-point in degrees. $T_C$ can specify a plateau time in minutes during which the set-point $S_B$ is maintained. $T_D$ indicates a ramp time in minutes, $\Delta_D$ represents the set-point delta relative to $S_B$ in degrees, and $S_D$ is an absolute set-point in degrees. $T_E$ expresses a plateau time in minutes during which set-point $S_D$ is maintained. $T_F$ sets a ramp time in minutes, $\Delta_F$ indicates a set-point delta relative to $S_D$ in degrees, and $S_F$ sets an absolute set-point in degrees.

Figure 10:
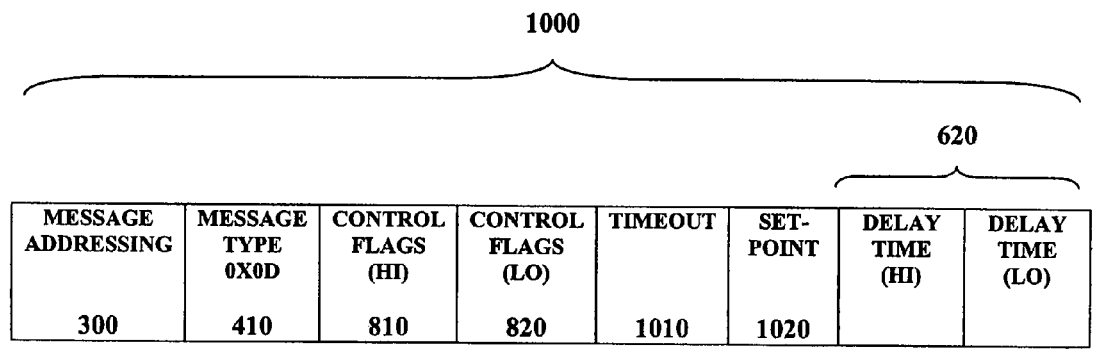
FIG. 10 depicts a thermostat set state command message according to one embodiment of the invention.

FIG. 10 shows an exemplary thermostat set state command message 1000. Message 1000 is designed to permit a thermostat owner to configure the thermostat's state. A thermostat owner could be a homeowner, business owner, or property manager, for example. In one embodiment, message 1000 mimics a corresponding thermostat front face control panel and can be overridden by the thermostat's control panel if desired. If message 1000 is received while any other control is in place, message 1000 will be preempted and ignored.

As in previous messages described above, message 1000 begins with message addressing 300, message type 410, and control flag 810 and 820 bytes. Control flag high byte 810 can be used to indicate whether a timeout 1010 is included, whether the set state command is temporary, and whether a heating or cooling mode is in use, among other indicators. Control flag low byte 820 can indicate whether timeout 1010 is expressed in hours or default minutes, whether a delay time 620 is included is in message 1000, and whether Celsius or Fahrenheit units are used, among other indicators. Optional timeout 1010 can be expressed in minutes or hours. At the end of the period specified in timeout 1010, the thermostat is restored to its default programmed state. Set-point temperature 1020 is also optional, as is a delay time 620.

Figure 11:
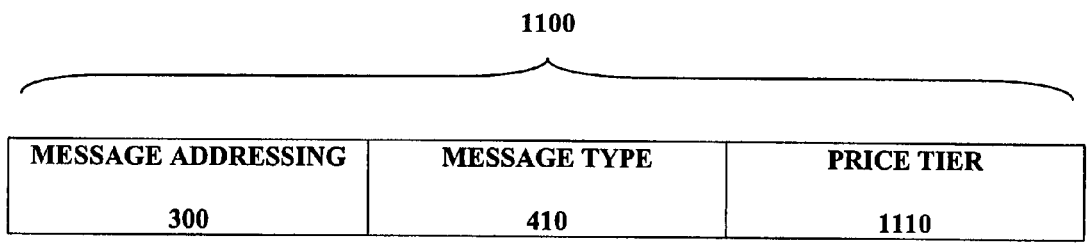
FIG. 11 depicts a thermostat price tier command message according to one embodiment of the invention.

Variable length message 420 can also comprise a thermostat price tier command message 1100, as shown in FIG. 11. Message 1100 sets a thermostat's price tier level 1110 to provide an indication of current cost of usage to a homeowner. Price tier 1110's valid range in one embodiment is from 0 to 4, wherein a message including a price tier 1110 of 0 will disable the price tier display indication.

Figure 12:
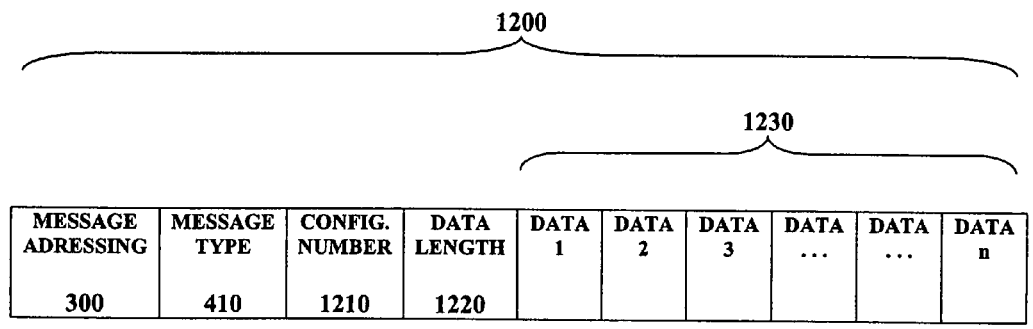
FIG. 12 depicts a configuration message according to one embodiment of the invention.

FIG. 12 depicts a configuration message 1200, another variable length message 420 format. Message 1200 is used to send configuration data to field devices. In one embodiment, message 1200 includes customary message addressing 300 and message type 410 bytes as described with reference to other available variable length messages 420, followed by a configuration number 1210 in the first data byte to indicate what to change. Configuration number 1210 is followed by a data length indicator byte 1220 and data 1230. In one embodiment, message 1210 can include up to about 255 bytes of data 1230.

Figure 13:
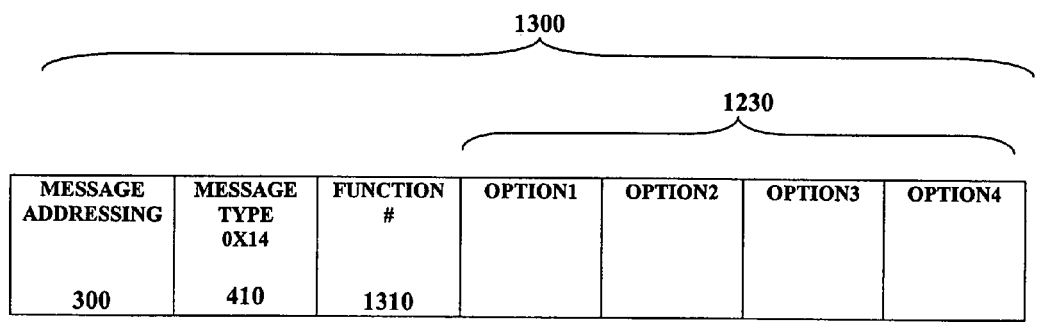
FIG. 13 depicts a maintenance function message according to one embodiment of the invention.

FIG. 13 illustrates one embodiment of a maintenance function message 1300. Maintenance function message 1300 can be used to perform internal maintenance in a field device, for example resetting a history counter, freezing a history counter, or similar functions. Message 1300 includes a function identifier 1310 and option bytes 1320. Function identifier 1310 indicates what maintenance function work will be performed. Option bytes 1320 provide the function work instruction. Option bytes 1320 can include load number bits such that a particular load or group of loads can be targeted with message 1300.

Figure 14:
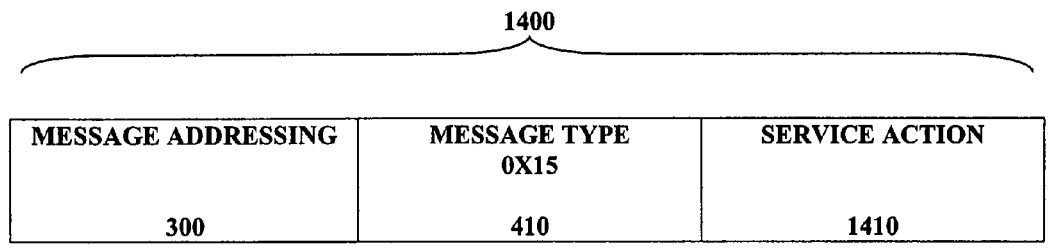
FIG. 14 depicts a permanent service change message according to one embodiment of the invention.

Variable length message 420 can also comprise a permanent service change message 1400, as shown in FIG. 14. Permanent service change messages 1400 can be used to deactivate or activate a field device or load from operation. Message 1400 thereby permits customers to be removed from a program without service personnel having to physically visit the remote site. In one embodiment, message 1400 can target a specific load or an entire unit. When an entire unit is out of service, the unit's lights will be turned off and the unit will respond only to a permanent service activate command message 1300 (refer to FIG. 13 and the corresponding description). Message 1400 includes standard message addressing 300 and message type 410 bytes followed by a service action byte 1410. Service action byte 1410 includes bits set to specify an activate or deactivate command and bits to specify a particular load or device to target.

Figure 15:
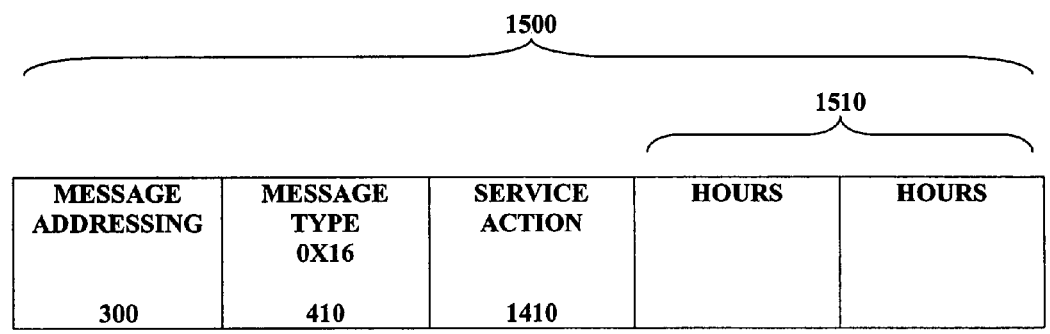
FIG. 15 depicts a temporary service change message according to one embodiment of the invention.

A temporary service change message 1500 is shown in FIG. 15. Message 1500 is used to temporarily deactivate a field device from operation for a specified number of hours, allowing customers to be removed from a program for a short period of time without having to send service personnel to the remote device. Message 1500 targets an entire unit. Message 1500 includes message addressing 300 and message type 410 bytes, followed by a service action byte 1410 and hour bytes 1510. A temporary service change message 1500 sent with 0 hours will keep the device permanently out of service, although the device's indicator lights could remain active and the device will continue to respond to configuration messages 1200 and maintenance messages 1300. Message 1500 also includes a flag byte 1410 that can be used to indicate a cancel, lights, and cold load pickup action. Hour bytes 1510 are used to specify the number of hours for the temporary service change. For example, hour bytes 1510 of "0x0048" would deactivate a device for 72 hours.

Figure 16:
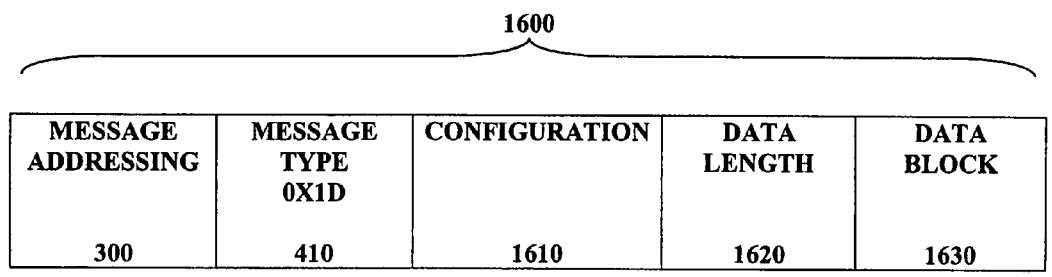
FIG. 16 depicts a data message according to one embodiment of the invention.

A data message 1600 as shown in FIG. 16 can be used to send a block of data to a field device. Data message 1600 includes a configuration byte 1610 to specify the format of the data being sent, for example binary or hex, and a data message length byte 1620. Data message block 1630 can include up to about 255 bytes of data in one embodiment. Message 1600 can also specify a port number for the data to be sent to in the device, where a "0" would send the data to the default port. Data within data block 1630 is sent in most significant bit (MSB) order.

Figure 17:
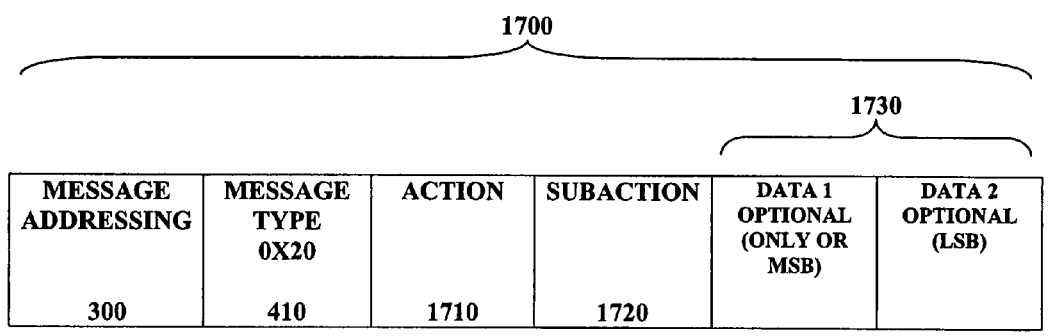
FIG. 17 depicts a capacitor control message according to one embodiment of the invention.

A capacitor command and control message 1700 as shown in FIG. 17 can be used to control information to capacitor bank controller (CBC) field devices. Command message 1700 can, for example, open or close a device, or enable or disable a local over-voltage/under-voltage specification. Following message addressing 300 and message type 410 bytes, message 1700 includes an action byte 1710 and sub-action byte 1720 and optional data 1730. Action byte 1710 can comprise a control byte followed by a particular sub-action 1720, for example an open, close, enable, or disable action command. Action byte 1710 can also comprise a configuration byte followed by a one- or two-byte sub-action 1720. Various sub-actions 1720 are available and can include, for example, a control relay time, an enable or disable CBC function, a brown out level action, a control limit, and an over-voltage/under-voltage calculation time, among a plurality of other available sub-actions 1720.

Utility 110 can also request a reply from a field device using a request data command message 1800. In one embodiment, data message 1800 comprises a start indicator 1802, an address level byte 1804, a service provider identification byte 1806, and message type byte 410. Data message 1800 also comprises a request identification byte 1808 that identifies the particular request and is returned with the device's reply to message 1800. Length of request descriptor 1810 specifies the number of bytes that follow to describe the requested data. The request format will be unique to different data requests and can include a data length requested. Request byte 1812 indicates what data is requested for return from the device and can include configuration data, an EEPROM data block, a meter data request, and a CBC data request. Subsequent request bytes 1814 up to a final request byte n 1816 will depend on request byte 1812. A schedule identification 1818 precedes the remaining bits, wherein the remaining bits are ignored if schedule identification 1818 is omitted. Period byte 1820 specifies how often to send a reply, for example an immediate reply and then every thirty minutes or at the start or end of the first period. Offset 1822 is used to specify when the first period starts relative to a real time clock. Offset 1822 can also be used to set a period start at receipt of message 1800 or at a random offset within period 1820. Timeout 1824 indicates a number of replies to send, wherein "00" indicates infinite replies until canceled. Terminator 1826 indicates the end of message 1800.

One embodiment of a data reply message 1900 is shown in FIG. 19 and is used to return data requested in a data request message 1800. Data message 1900 identifies the data and the original data request. Address level 1804 follows start indicator 1802 and is included for format compatibility. An optional 32-bit Hex serial number of the device sending message 1900 can be included as address serial bytes 1902. The request ID 1808 from the original data request message 1800 is included after message type byte 410 and can also indicate an unsolicited reply. Length of request descriptor 1810 indicates the number of bytes that follow to describe the requested data. The request format will be unique to different data requests and can include a data length requested. Descriptor 1810 can be "00" for solicited replies in which request identification 1808 is sufficient to identify the requested data type. Request bytes 1812, 1814, and 1816 indicate what is returned and request length 1904 indicates the length of the data in binary bytes. The requested or unsolicited data follows in data block 1906 and is followed by message terminator 1826.

Figure 20:
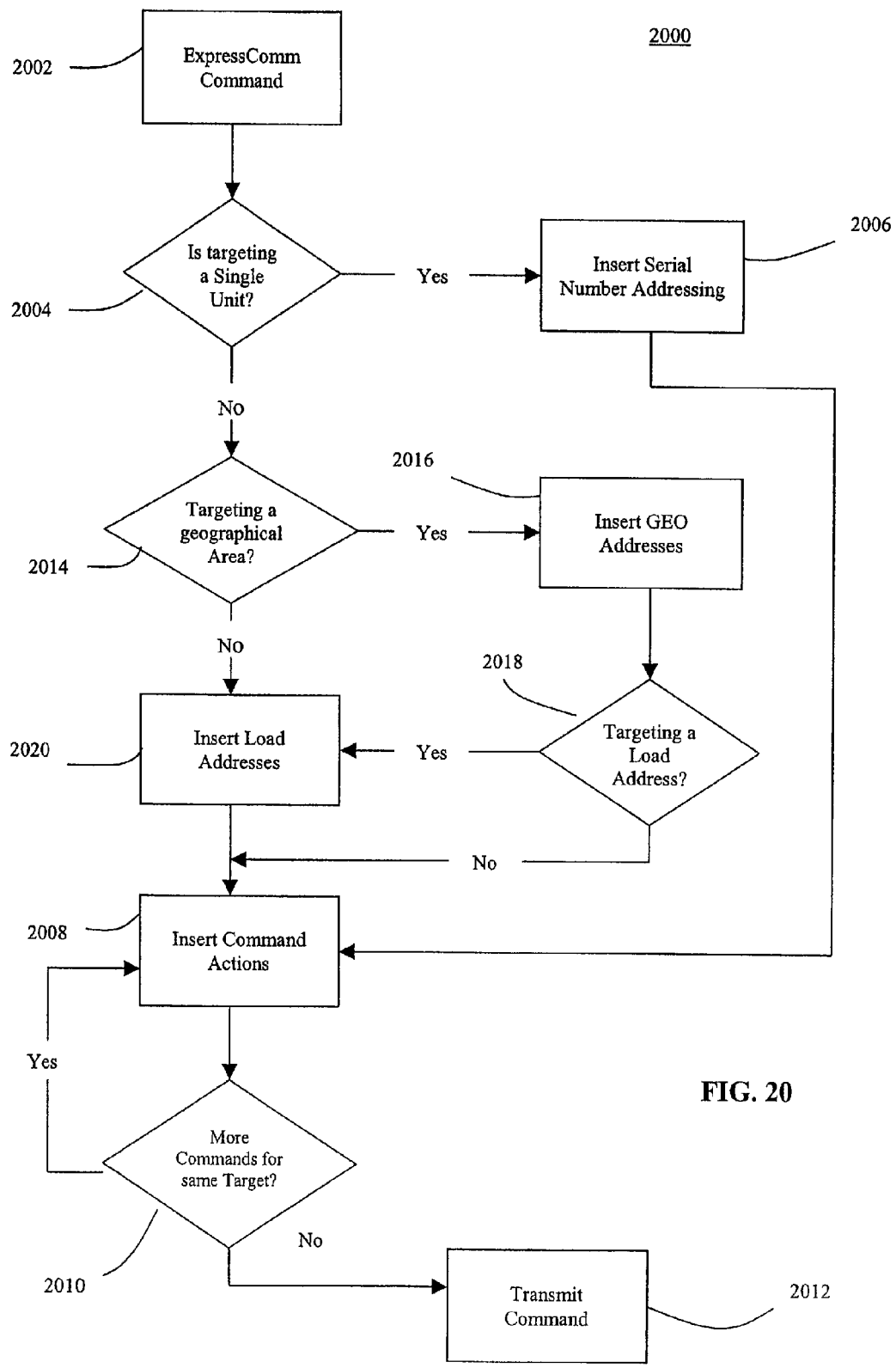
FIG. 20 is a flow chart of a method of communicating between a utility and an end user according to one embodiment of the protocol of the invention.

Referring also to FIG. 1, FIG. 20 is a flow chart that illustrates one embodiment of a method 2000 of communicating between utility 110 and end user 120 devices, such as AC unit 140 and furnace unit 150, using the computer-implemented protocol of the invention. In this example embodiment, a protocol command message in accordance with one of the command message formats described herein above is formulated at a utility control center 112 computer at step 2002. In one embodiment, message formulation is performed at the utility end using software implementing the communication protocol and message compositions and formats described above. At decision step 2004 the command message target is analyzed. If the command message is targeting a single device unit, serial number addressing is inserted into the command message at step 2006. Next, at step 2008, the desired command action is inserted into the command message. Additional command actions for the same target(s) can be inserted at step 2010, resulting in variable length command messages that are transmitted to the desired controller 170, thermostat 160, and device 140 and 150 targets at step 2012. As previously described, the command messages can be sent from utility 110 to end user 120 or multiple end users or groups in RF communications from transmitter 180, via POTS 190 and 192, or via power line 130 wired transmissions.

The computer-implemented communication protocol of the invention facilitates communication with a single targeted unit or with a plurality of targeted units that are geographically dispersed. The geographically dispersed units that are targeted can be a defined geographical area group or can be particular targets defined by their load addresses. A utility can therefore select a group based upon a peaking load condition in a limited geographic area to be targeted for load reduction to prevent the peak condition from affecting a wider geographic area. A particular set of high consumption devices can also be targeted as a group, for example air conditioning units known to consume more power in high temperature conditions. A utility can also define a group based upon end user participation levels. For example, a first group of users could be targeted first for load reduction in exchange for the lowest overall power rate offered under a particular plan. A second group could be targeted next as needed in exchange for an overall power rate slightly higher than the first group's but yet lower than the standard rate. Other groups can also be defined as desired.

Returning to step 2004, if the command message of step 2002 is targeting more than an individual unit, then at step 2014 it is determined whether the target is a geographical area. If yes, then the geographical area address(es) are inserted at step 2016. If particular load addresses are also being targeted (step 2018) or if the load addresses are the desired targets, those addresses are inserted at step 2020. The desired command action(s) are then inserted into the command message at steps 2008 and 2010 and the command message is transmitted. Upon receipt of the command message at controller 170, the command actions are implemented according to the criteria specified in the message at the targeted devices.

In one embodiment, the protocol, system, and method of the invention are compatible with existing communications protocols while still providing the versatile addressing and command messaging options of the invention. Previous-generation communication protocols and predecessor messaging techniques can thereby be incorporated into new systems or expanded and updated by the invention to provide additional cost-savings and versatility.

The invention thereby provides a protocol, system, and method for managing utility loads and communicating control commands to remotely located power-consuming devices. The invention may be embodied in other specific forms without departing from the spirit of the essential attributes thereof; therefore the illustrated embodiments should be considered in all respects as illustrative and not restrictive, reference being made to the appended claims rather than to the foregoing description to indicate the scope of the invention.

What is claimed is:

1. A method for managing a utility load by controlling electrical consumption of electrically powered devices, the method comprising:
   selecting at least one target for load control and assigning the at least one target at least one target address;
   using a control system of a utility provider to form a single variable length load control message according to a communication protocol, wherein the load control message includes the at least one target address and a plurality of unique concatenated command messages as part of the single variable length load control message, each of the plurality of unique concatenated command messages being selected from the set consisting of a command message having a predetermined message type and a fixed length message defined for the predetermined message type and a command message having a predetermined message type and a variable length message corresponding to values in a command message control flag field defined for the predetermined message type; and
   causing the load control message to be transmitted via a communication network to the at least one target for execution of all of the plurality of unique concatenated command messages by the at least one target corresponding to the at least one target address in the load control message.

2. The method of claim 1, wherein the plurality of unique concatenated command messages includes a priority command message.

3. The method of claim 1, wherein causing the load control message to be transmitted via a communication network comprises causing the load control message to be transmitted via a wireless communication network.

4. The method of claim 3, wherein causing the load control message to be transmitted via a wireless communication network comprises causing the load control message to be transmitted via a wireless communication at a radio frequency.

5. The method of claim 1, wherein causing the load control message to be transmitted via a communication network comprises causing the load control message to be transmitted via a wired communication network.

6. The method of claim 5, wherein causing the load control message to be transmitted via a wired communication network comprises causing the load control message to be transmitted via a wired communication network, the wired communication network selected from a group consisting of a power line communication network, a telephone service network and an internet service network.

7. The method of claim 1, further comprising formatting the load control message according to a selected communication interface, the communication interface selected from the group consisting of one-way paging protocols, analog cellular control channel two-way communication protocols, short-message service digital two-way communication protocols, and serial compliant digital network protocols.

8. The method of claim 1, wherein forming a variable length load control message according to a communication protocol comprises forming a variable length load control message according to a binary byte-oriented communication protocol.

9. The method of claim 1, wherein the plurality of unique concatenated command messages are selected from a group consisting of specific load management messages, configuration messages, maintenance messages, data messages, and customizable messages.

10. The method of claim 1, wherein the plurality of unique concatenated command messages are selected from a group consisting of:
   frequency synchronize the at least one target device
   time synchronize the at least one target device with the control center;
   set priority of the plurality of concatenated command messages;
   test signal reception of the at least one target device;
   initiate control of the at least one target device for a period of time;
   cancel control of the at least one target device;
   provide under-frequency control of the at least one target device;
   provide under-voltage control of the at least one target device;
   cycle the at least one target device off for a cycle period;
   modify a thermostat temperature set-point of the at least one target device;
   set a thermostat limit temperature of the at least one target device;
   configure a thermostat state of the at least one target device;
   set a thermostat price tier level of the at least one target device;
   send data to the at least one target device;

request data from the at least one target device;
log data from the at least one target device;
configure the at least one target device;
perform internal maintenance of the at least one target device;
permanently deactivate the at least one target device;
activate the at least one target device;
temporarily deactivate the at least one target device;
temporarily activate the at least one target device; and
send control information to a capacitor bank controller.

11. The method of claim 1, wherein the at least one target comprises a plurality of end user devices defined as at least one group and the at least one target address comprises at least one group-level address.

12. The method of claim 11, wherein the at least one group comprises at least one load-level group.

13. The method of claim 11, wherein the at least one group comprises at least one geographic area.

14. The method of claim 13, wherein the at least one geographic area is defined by a postal code.

15. The method of claim 13, wherein the geographic area is defined by a service provider identifier.

16. The method of claim 1, wherein the command messages having a predetermined message type and a fixed length message are selected from a group consisting of:
a command message having a hexadecimal message type code 01 and a one-byte length message for frequency synchronizing the at least one target device;
a command message having hexadecimal message type code 03 and a one-byte length message for setting priority of the plurality of concatenated command messages;
a command message having a hexadecimal type code 05 and a one-byte length message for testing signal reception of the at least one target device;
a command message having a hexadecimal type code 0E and a one-byte length message for setting a thermostat price tier level of the at least one target device;
a command message having hexadecimal type code 14 and a five-byte length message for performing internal maintenance of the at least one target device;
a command message having hexadecimal type code 15 and a one-byte message field for permanently deactivating the at least one target device; and
a command message having hexadecimal type code 15 and a one-byte message field for permanently activating the at least one target device.

17. The method of claim 1, wherein the command messages having a predetermined message type and a variable length message are selected from the group consisting of:
a command message having a hexadecimal type code 02 and a variable-length message for time synchronizing the at least one target device with a control center;
a command message having a hexadecimal type code 08 and a variable-length message for initiating control of the at least one target device for a period of time;
a command message having a hexadecimal type code 09 and a variable-length message for cancelling control of the at least one target device;
a command message having a hexadecimal type code 0A and a variable-length message for cycling the at least one target device off for a cycle period;
a command message having a hexadecimal type code 0B and a variable-length message for modifying a thermostat temperature set-point of the at least one target device;
a command message having a hexadecimal type code 0C and a variable-length message for cycling the at least one target device off for a cycle period depending on temperature limits;
a command message having a hexadecimal type code 0D and a variable-length message for configuring a thermostat state of the at least one target device;
a command message having a hexadecimal type code 10 and a variable-length message for sending configuration data to the at least one target device;
a command message having a hexadecimal type code 16 and a variable-length message for temporarily deactivating the at least one target device;
a command message having a hexadecimal type code 1D and a variable-length message for sending a block of data to the at least one target device;
a command message having a hexadecimal type code 20 and a variable-length message for sending control information to a capacitor bank controller;
a command message having a hexadecimal type code 2C and a variable-length message for requesting a reply from the at least one target device; and
a command message having a hexadecimal type code 2D and a variable-length message for requesting a reply receipt from the at least one target device.

18. A method for managing electrical consumption of electrically powered device in communication with a control system of a utility provider, the method comprising:
receiving at a controller of an electrically powered device in communication with a control system of a utility provider a single variable length load control message, the load control message including an address of the controller and a plurality of unique concatenated command messages as part of the single variable length load control message, each of the plurality of unique concatenated command messages being selected from the set consisting of a command message having a predetermined message type and a fixed length message defined for the predetermined message type and a command message having a predetermined message type and a variable length message corresponding to values in a command message control flag field defined for the predetermined message type;
decoding the load control message into the plurality of unique command messages; and
controlling the device with the controller so as to execute of all of the plurality of unique command messages, thereby managing consumption of electricity of the electrically powered device.

19. The method of claim 18, further comprising transmitting data from the controller to the utility.

20. The method of claim 18, wherein the plurality of unique concatenated command messages includes a priority command message.

21. The method of claim 18, wherein receiving at a controller a single variable length load control message comprises receiving at a controller a single variable length load control message over a wireless network.

22. The method of claim 21, wherein receiving at a controller a single variable length load control message over a wireless network comprises receiving at a controller a single variable length load control message over a wireless network operating at a radio frequency.

23. The method of claim 18, wherein receiving at a controller a single variable length load control message comprises receiving at a controller a single variable length load control message over a wired network.

24. The method of claim 19, wherein receiving at a controller a single variable length load control message over a wired network comprises receiving at a controller a single variable length load control message over a wired network, the wired network selected from a group consisting of a power line communication network, a telephone service network and an internet service network.

25. The method of claim 18, wherein the variable length load control message is formatted according to a selected communication interface, the communication interface selected from the group consisting of one-way paging protocols, analog cellular control channel two-way communication protocols, short-message service digital two-way communication protocols, and serial compliant digital network protocols.

26. The method of claim 18, wherein the plurality of unique concatenated command messages are selected from a group consisting of specific load management messages, configuration messages, maintenance messages, data messages, and customizable messages.

27. The method of claim 18, wherein the plurality of unique concatenated command messages are selected from a group consisting of:
frequency synchronize the at least one target device time synchronize the at least one target device with the control center;
set priority of the plurality of concatenated command messages;
test signal reception of the at least one target device;
initiate control of the at least one target device for a period of time;
cancel control of the at least one target device;
provide under-frequency control of the at least one target device;
provide under-voltage control of the at least one target device;
cycle the at least one target device off for a cycle period;
modify a thermostat temperature set-point of the at least one target device;
set a thermostat limit temperature of the at least one target device;
configure a thermostat state of the at least one target device;
set a thermostat price tier level of the at least one target device;
send data to the at least one target device;
request data from the at least one target device;
log data from the at least one target device;
configure the at least one target device;
perform internal maintenance of the at least one target device;
permanently deactivate the at least one target device;
activate the at least one target device;
temporarily deactivate the at least one target device;
temporarily activate the at least one target device; and
send control information to a capacitor bank controller.

28. The method of claim 18, wherein the command messages having a predetermined message type and a fixed length message are selected from a group consisting of:
a command message having a hexadecimal message type code 01 and a one-byte length message for frequency synchronizing the at least one target device;
a command message having hexadecimal message type code 03 and a one-byte length message for setting priority of the plurality of concatenated command messages;
a command message having a hexadecimal type code 05 and a one-byte length message for testing signal reception of the at least one target device;
a command message having a hexadecimal type code 0E and a one-byte length message for setting a thermostat price tier level of the at least one target device;
a command message having hexadecimal type code 14 and a five-byte length message for performing internal maintenance of the at least one target device;
a command message having hexadecimal type code 15 and a one-byte message field for permanently deactivating the at least one target device; and
a command message having hexadecimal type code 15 and a one-byte message field for permanently activating the at least one target device.

29. The method of claim 18, wherein the command messages having a predetermined message type and a variable length message are selected from the group consisting of:
a command message having a hexadecimal type code 02 and a variable-length message for time synchronizing the at least one target device with a control center;
a command message having a hexadecimal type code 08 and a variable-length message for initiating control of the at least one target device for a period of time;
a command message having a hexadecimal type code 09 and a variable-length message for cancelling control of the at least one target device;
a command message having a hexadecimal type code 0A and a variable-length message for cycling the at least one target device off for a cycle period;
a command message having a hexadecimal type code 0B and a variable-length message for modifying a thermostat temperature set-point of the at least one target device;
a command message having a hexadecimal type code 0C and a variable-length message for cycling the at least one target device off for a cycle period depending on temperature limits;
a command message having a hexadecimal type code 0D and a variable-length message for configuring a thermostat state of the at least one target device;
a command message having a hexadecimal type code 10 and a variable-length message for sending configuration data to the at least one target device;
a command message having a hexadecimal type code 16 and a variable-length message for temporarily deactivating the at least one target device;
a command message having a hexadecimal type code 1D and a variable-length message for sending a block of data to the at least one target device;
a command message having a hexadecimal type code 20 and a variable-length message for sending control information to a capacitor bank controller;
a command message having a hexadecimal type code 2C and a variable-length message for requesting a reply from the at least one target device; and
a command message having a hexadecimal type code 2D and a variable-length message for requesting a reply receipt from the at least one target device.

30. A method, comprising:
providing a controller for controlling electrical consumption of an electrically powered device; and
providing instructions on operating the controller in accordance with a communication protocol, wherein the instructions include the steps of:
receiving at the controller in communication with a control system of a utility provider a single variable length load control message, the load control message including at least a plurality of unique concatenated command messages as part of the single variable length load control message, each of the plurality of unique concatenated command messages being selected from the set consisting of a command message having a predetermined message type and a fixed length message defined for the predetermined message type and a command message having a predetermined message type and a variable length message corresponding to values in a command message control flag field defined for the predetermined message type;

decoding the load control message into the plurality of command messages; and controlling the device with the controller so as to execute of all of the plurality of unique command messages, thereby managing consumption of electricity of the electrically powered device.

31. The method of claim 30, wherein the command messages having a predetermined message type and a fixed length message are selected from a group consisting of:

a command message having a hexadecimal message type code 01 and a one-byte length message for frequency synchronizing the at least one target device;

a command message having hexadecimal message type code 03 and a one-byte length message for setting priority of the plurality of concatenated command messages;

a command message having a hexadecimal type code 05 and a one-byte length message for testing signal reception of the at least one target device;

a command message having a hexadecimal type code 0E and a one-byte length message for setting a thermostat price tier level of the at least one target device;

a command message having hexadecimal type code 14 and a five-byte length message for performing internal maintenance of the at least one target device;

a command message having hexadecimal type code 15 and a one-byte message field for permanently deactivating the at least one target device; and a command message having hexadecimal type code 15 and a one-byte message field for permanently activating the at least one target device.

32. The method of claim 30, wherein the command messages having a predetermined message type and a variable length message are selected from the group consisting of:

a command message having a hexadecimal type code 02 and a variable-length message for time synchronizing the at least one target device with a control center;

a command message having a hexadecimal type code 08 and a variable-length message for initiating control of the at least one target device for a period of time;

a command message having a hexadecimal type code 09 and a variable-length message for cancelling control of the at least one target device;

a command message having a hexadecimal type code 0A and a variable-length message for cycling the at least one target device off for a cycle period;

a command message having a hexadecimal type code 0B and a variable-length message for modifying a thermostat temperature set-point of the at least one target device;

a command message having a hexadecimal type code 0C and a variable-length message for cycling the at least one target device off for a cycle period depending on temperature limits;

a command message having a hexadecimal type code 0D and a variable-length message for configuring a thermostat state of the at least one target device;

a command message having a hexadecimal type code 10 and a variable-length message for sending configuration data to the at least one target device;

a command message having a hexadecimal type code 16 and a variable-length message for temporarily deactivating the at least one target device;

a command message having a hexadecimal type code 1D and a variable-length message for sending a block of data to the at least one target device;

a command message having a hexadecimal type code 20 and a variable-length message for sending control information to a capacitor bank controller;

a command message having a hexadecimal type code 2C and a variable-length message for requesting a reply from the at least one target device; and a command message having a hexadecimal type code 2D and a variable-length message for requesting a reply receipt from the at least one target device.

33. An apparatus for managing a utility load by controlling electrical consumption of an electrically powered device, comprising:

means for selecting at least one target for load control and for assigning the at least one target at least one target address;

means for forming a variable length load control message, the variable length load control message including:

a start indicator field indicating a start of the variable length load control message;

a variable length address field including a fixed bit-length portion identifying an address level, and a variable bit-length portion identifying a target address corresponding to the at least one electrically powered device;

a plurality of unique concatenated command messages, each of the plurality of unique concatenated command messages being selected from the set consisting of a command message having a predetermined message type field and fixed length message field for a fixed length message defined by the predetermined message type, and a command message having a message type field for a predetermined message type and a variable length message field corresponding to values in a command message control flag field defined for a message type of the message type field; and a message terminator field indicating a termination of the variable length load control message; and means for interfacing with a communication network communicatively coupled to the at least one target device, such that the variable length load control message may be transmitted via the communication network to the at least one target device for execution of the plurality of unique command messages.

34. An apparatus for managing a utility load by controlling electrical consumption of an electrically powered device, comprising:

means for receiving a variable length load control message, the variable length load control message including:

a start indicator field indicating a start of the variable length load control message;

a variable length address field including a fixed bit-length portion identifying an address level, and a variable bit-length portion identifying a target address corresponding to the at least one electrically powered device;

a plurality of unique concatenated command messages, each of the plurality of unique concatenated command messages being selected from the set consisting of a command message having a predetermined message type field and fixed length message field for a fixed length message defined by the predetermined message type, and a command message having a message type field for a predetermined message type and a variable length message field corresponding to values in a command message control flag field defined for a message type of the message type field; and a message terminator field indicating a termination of the variable length load control message;

means for decoding the load control message into the plurality of unique command messages; and means for controlling the device with the controller so as to execute of all of the plurality of unique command messages, thereby managing consumption of electricity of the electrically powered device.

* * * * *